(12) United States Patent
Jones

(10) Patent No.: US 8,506,687 B2
(45) Date of Patent: Aug. 13, 2013

(54) ELECTROSTATIC PRECIPITATOR AND SELF CLEANING COLLECTION BELT THEREFOR

(75) Inventor: Chetwyn Jones, Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 556 days.

(21) Appl. No.: 12/769,035

(22) Filed: Apr. 28, 2010

(65) Prior Publication Data

US 2010/0269699 A1      Oct. 28, 2010

Related U.S. Application Data

(60) Provisional application No. 61/213,015, filed on Apr. 28, 2009.

(51) Int. Cl.
*B03C 3/74*          (2006.01)

(52) U.S. Cl.
USPC ........ 96/40; 55/290; 55/296; 55/354; 55/400; 96/43; 96/50; 96/51; 96/94

(58) Field of Classification Search
USPC ........... 96/39, 40, 42, 51, 94, 43, 50; 55/290, 55/295–297, 351, 354, 400; 198/851–853
See application file for complete search history.

(56) References Cited

U.S. PATENT DOCUMENTS

| | | | |
|---|---|---|---|
| 2,579,440 A | | 12/1951 | Palmer |
| 3,650,092 A | * | 3/1972 | Gourdine et al. ................. 96/40 |
| 3,701,236 A | * | 10/1972 | Rotsky et al. ..................... 96/40 |
| 3,912,467 A | * | 10/1975 | Trump et al. ...................... 96/94 |
| 4,440,552 A | * | 4/1984 | Uchiya et al. ..................... 96/40 |
| 5,110,324 A | * | 5/1992 | Testone et al. .................... 95/73 |
| 6,958,088 B1 | * | 10/2005 | Moriyama ........................ 96/39 |
| 2007/0080048 A1 | | 4/2007 | Messick, Jr. et al. |

* cited by examiner

*Primary Examiner* — Richard L Chiesa
(74) *Attorney, Agent, or Firm* — Buchanan Ingersoll & Rooney PC

(57) ABSTRACT

An electrostatic precipitator for removing a particulate material includes a housing having an internally formed air path communicating between an inlet for drawing polluted air containing particulate material and an air outlet for emitting clean air purified by removing the particulate material, an air stream generator that generates an air stream, a discharging mechanism that charges the particulate material, and a collection device provided in the air stream to collect the particulate material which has been charged by the discharging mechanism. The collection device includes a collection belt including a flat wire belt defining a three-dimensional collection surface. The precipitator further includes a brush and vacuum assembly for removing the particulate material and reducing the risk of reentrainment in the air stream.

20 Claims, 3 Drawing Sheets

ELECTROSTATIC PRECIPITATOR AND SELF CLEANING COLLECTION BELT THEREFOR

TECHNICAL FIELD

The present invention relates to an electrostatic precipitator, more particularly an electrostatic precipitator capable of collecting an electrically charged fine particulate by using a moving collection surface, and still more particularly, a plurality of moving three-dimensional collection elements.

BACKGROUND

Conventionally, before emitting so-called "industrial waste gases", such as exhaust gases of boilers in factories and smoke from power generating plants, into the atmosphere, air purification processing is performed to remove various types of fine particulates contained in the industrial waste gases, such as mist and dust containing, for example, powders containing oil, moisture, and/or the like, which can pollutes the atmosphere. Direct emission of the industrial waste gases containing the fine particulate into the atmosphere significantly affects the global environment, so that there are cases where it is obligatory to perform collection thereof by standards of a national or local governments. Dust collection is one of several purification techniques used to collect fine particles contained in polluted air.

The dust collection principle of electrostatic dust precipitators is such that electric charges are supplied to the fine particulate through corona discharges generated from discharge electrodes, and coulomb forces are used to electrostatically attract the charged fine particulate onto collector electrodes which are opposed electrodes, whereby the fine particulate is collected. An electrostatic precipitator has significant advantages, such as: 1) the pressure loss is small; 2) a large amount of gases can be processed; and 3) the collection efficiency is high. Therefore, electrostatic precipitators are commonly used in such environments as factories and power generating plants which emit a large amount of polluted air.

Generally, the construction of an electrostatic precipitator includes discharge electrodes each formed into a shape having a large surface curvature, such as a needle or wire material, for generating corona discharges for supplying electric charges to the fine particulate; collector electrodes, as opposed electrodes, each formed into a flat plate for collecting the charged fine particulate; a rectifier unit for rectifying the flow of gas streams in the electrostatic dust precipitator; a dust removal device for separating deposited fine particulate from the collector electrodes; a hopper for collecting the separated fine particulate; and a power system and electric charge control device to cause corona discharges. In using the dust removal unit of a electrostatic precipitator, the collector electrodes are rapped by a hammer or the like to dislodge collected fine particulate therefrom and collect the fine particulate in a collection unit, such as a hopper, provided in a lower portion. When a large amount of the fine particulate is collected onto the collector electrodes, the coulomb force for attracting the charged fine particulate may be reduced, thereby reducing the collection efficiency. Therefore, dust removal units are important in order to remove a build up of the fine particulate from the collector plates.

However, the cleaning of the collection plates of the prior art systems presents a serious problem inasmuch as a substantial amount of reentrainment of the dust occurs. Because of the proximity of the plates to the gas flow channel, some of the dust particles dislodged during the rapping process are reintroduced into the gas stream. The reentrained particles must then be recharged and again collected for effective removal from the gas stream.

Prior attempts to increase the efficiency of the prior art systems have included the use of additional collection plates in the gas flow channel to increase the surface area available for deposition of the dust. Although producing some increase in efficiency and length of operating times between cleanings, this approach results in significant increases in the overall size and complexity of the precipitation systems and is therefore not entirely satisfactory.

Precipitators have also been proposed in which the particle collection surfaces are in the form of endless belts that continuously move through the collection zone. For example, in the U.S. Pat. No. 2,579,440 to Palmer, the contents of which are hereby incorporated by reference, dust particles are collected on a moving belt that has been charged to a polarity opposite to that imparted to the dust particles and are removed from the belt surfaces at a point remote from the gas stream. Such apparatus is, however, subject to the disadvantage that the charges applied to the surfaces of the belts are susceptible of being pulled off the belts by the charged dust particles. When this occurs, the particular dust particles affected are not removed from the gas stream and, in addition, the precipitation field is weakened because the charge carried by the belts is reduced.

It is an object of this invention to enhance electrostatic precipitation efficiency by combining an improved collection surface in which the electrostatic field forces acting on the deposited particles are strong enough throughout the collection surface to capture and retain the particles, and an improved dust collection system which reduces the incidence of particle reentrainment.

SUMMARY

These and other objects of the invention are provided by providing an electrostatic precipitator including a housing having an internally formed air path communicating between an inlet for drawing polluted air containing particulate material and an air outlet for emitting clean air purified by removing the particulate material. An air stream generating means generates the air stream and a discharging means is provided for charging the particulate material. A collection device is provided in the air stream to collect the particulate material which has been charged by the discharging means. The collection device includes a collection belt which continuously rotates about opposed sprockets, the collection belt preferably comprising a flat wire belt defining a three-dimensional collection surface. The electrostatic precipitator further includes a brush and vacuum assembly for removing the collected particulate while reducing the risk of reentrainment in the air stream.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION

Figure 1:
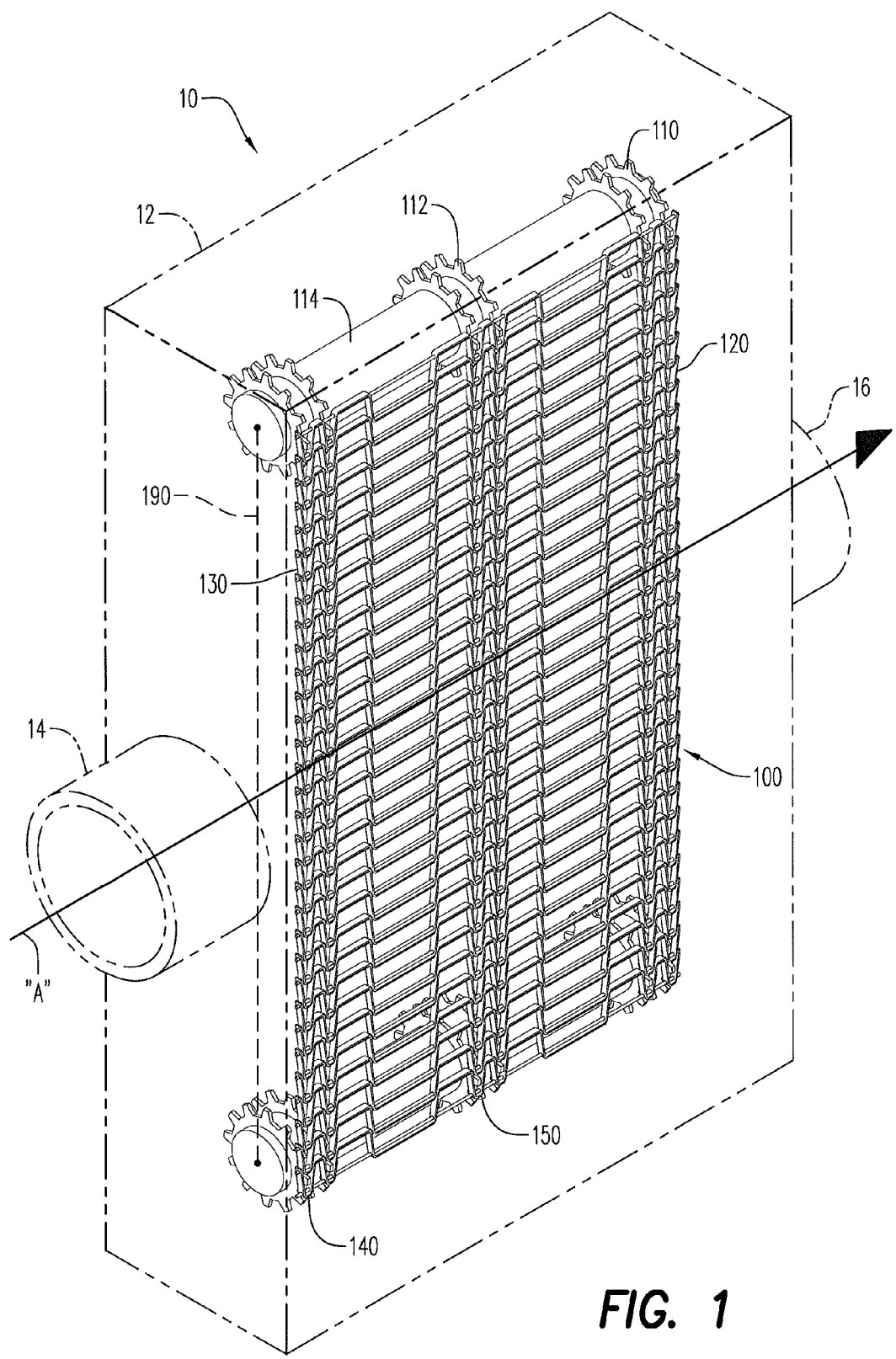
FIG. 1 is a perspective view of an electrostatic precipitator according to a preferred embodiment of the invention.

The collection surface for an electrostatic precipitator 10 in accordance with a preferred embodiment of the invention includes a collection belt 100 driven about an array of sprockets 110 arranged on a shaft 114 at either the top and/or the bottom of the device, as shown generally in FIG. 1. The moving collection belt is designed as a continuous loop so as to maximize the available collection surface area while minimizing pressure drop. Collection belt 100 preferably comprises a flat wire conveyor belt, as described more fully in U.S. Patent Publication No. 2007/0080048, the contents of which are hereby incorporated by reference.

Figure 3:
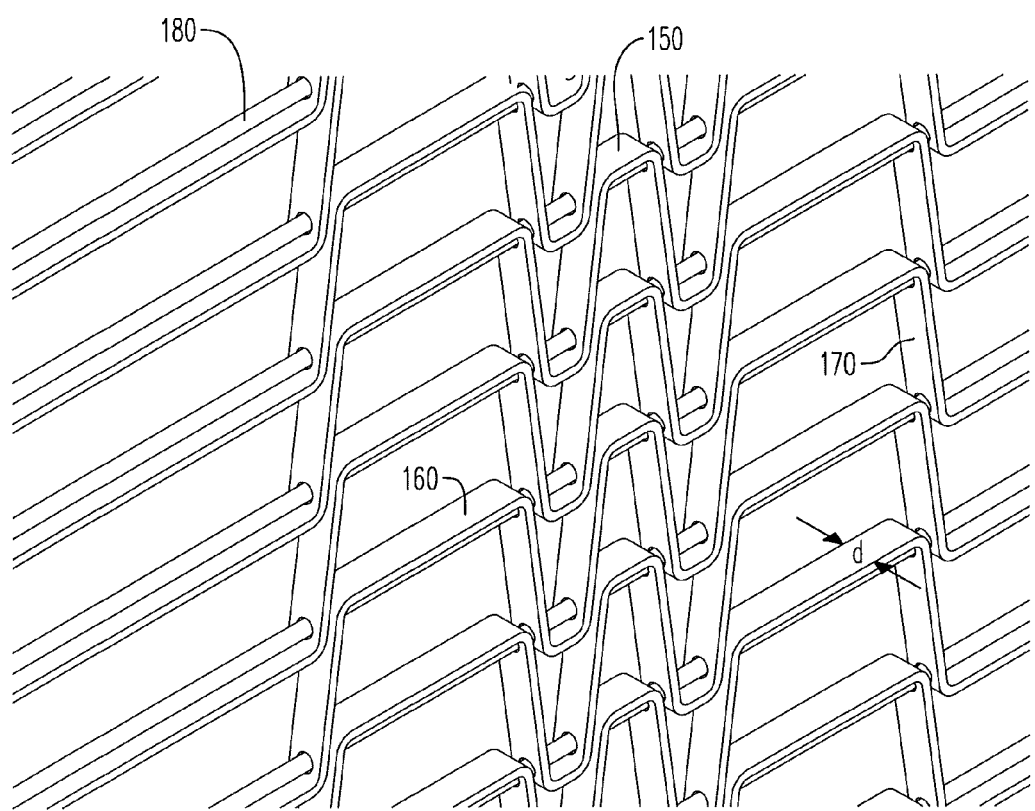
FIG. 3 is an enlarged fragmentary perspective view of the collection belt shown in FIG. 1.

Referring also to FIG. 3, belt 100 includes a plurality of spaced tractive rods 180 disposed in succession and transversely with respect to a direction of travel, each rod 180 having two ends 205 and 207. Belt 100 further includes a plurality of rows of wickets 160 transversely disposed with respect to the direction of travel, and interconnecting the succession of rods 180. Each row of wickets 160 is comprised of a plurality of links 170, each link connecting a rod 180 with a following rod in the succession. In addition, belt 100 preferably includes at least one row of edge links 140 disposed along each edge 120, 130 of the collection belt for engagement with the sprockets 110. Depending upon the particular application, belt 100 may also be manufactured with several rows of links 150 disposed between edge links 140 for engagement with center sprockets 112, as shown in FIG. 1. Unlike collection plates or rubber belts used in conventional electrostatic precipitators, which present a substantially two-dimensional surface for collection, the use of belt 100 provides a three-dimensional collection surface area. That is, each wicket 160 has a depth "d" defining the thickness of the wicket and ranging from approximately 0.188" to approximately 0.500".

The electrostatic precipitator 10 further includes discharging means such as electrodes or high voltage lines 190 for charging the particulate material entrained in the air flow "A" passing through the precipitator housing 12 by way of air inlet 14 and air outlet 16. The air flow is preferably created by an air stream generator (not shown). The material for the collection belt 100 is selected based upon its ability to serve as a proper ground, examples of which include stainless and carbon steels. The collection belt 100 is preferably grounded through contact with the sprockets 110, 112 which are attached to grounded shaft 114. Thus, the charged particles entrained in air flow "A" are collected on the surface of collection belt 100 as the air flow passes through precipitator 10. The collection belt 100 can also be grounded via a contact brush (not shown).

Figure 2:
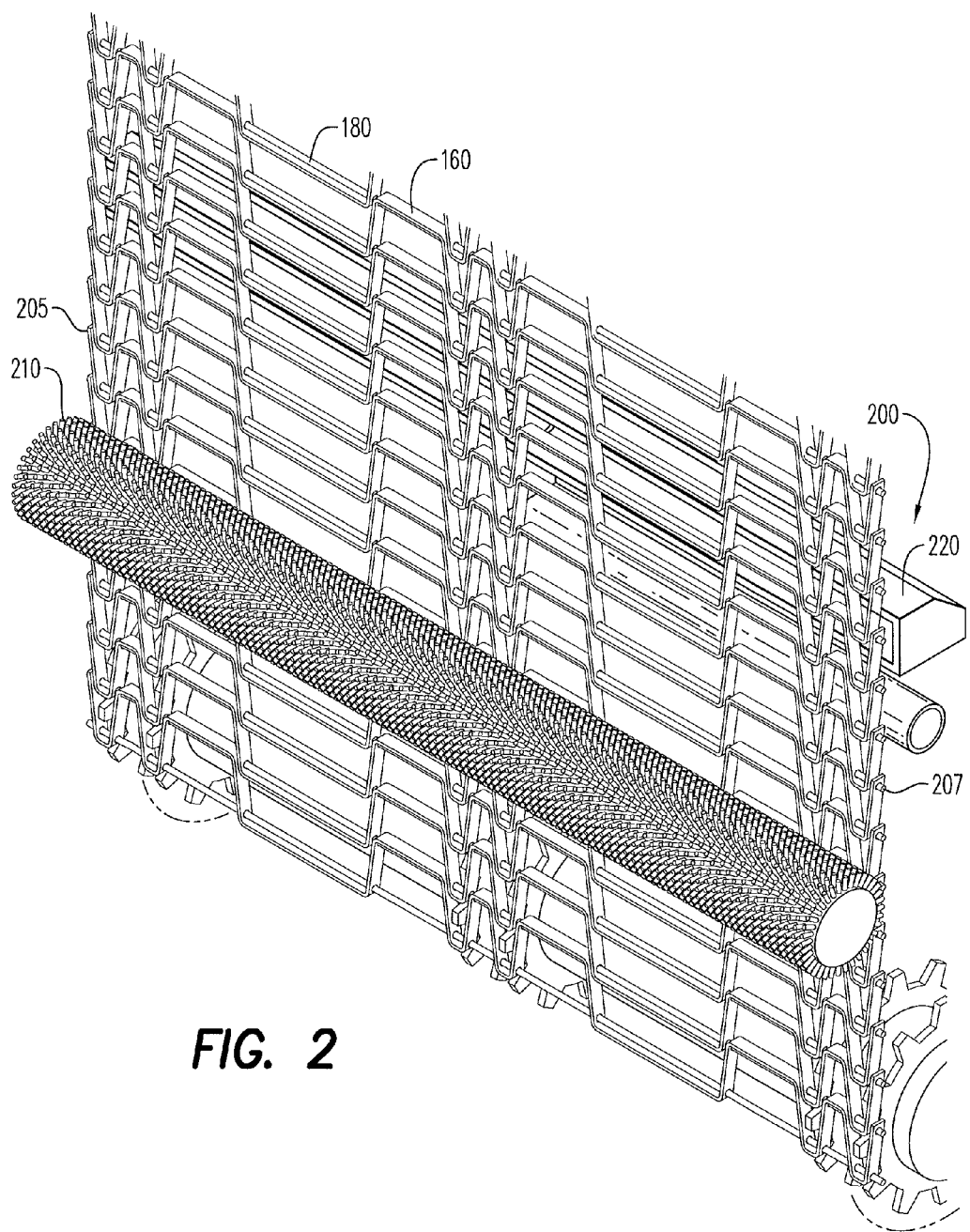
FIG. 2 is a perspective view of the cleaning system for the collection belt shown in FIG. 1.

In order to remove the particulate material that is collected on belt 100, the invention further provides a rotary brush and/or linear brush vacuum system 200, as shown more clearly in FIG. 2. More particularly, as the collection belt 100 is moving, a rotary brush 210 is preferably provided to engage the belt surface and dislodge the collected particulate material thereon. The rotary brush 210 may be stationary or powered to rotate either with or opposite to the direction of travel of belt 100. One skilled in the art will appreciate that a linear brush or any other type of brush device could also be used for the same purpose. In order to avoid the particulate material from becoming reentrained in the air flow, a vacuum nozzle 220 is provided in close proximity to the brush 210. Hence, any particles dislodged by the rotary brush 210 are immediately removed by the vacuum system 200. Thus, the present invention reduces the amount of particulate material that will be reentrained in the air stream and it avoids the need for interrupting the electrostatic precipitator in order to empty a hopper or otherwise remove particles that have been collected due to the self-cleaning nature of the brush and vacuum system 200. The electrostatic precipitator according to the invention can thus be continuously cleaned without affecting the performance of the precipitator.

Although certain preferred embodiments of the present invention have been shown and described in detail, it should be understood that various changes and modifications may be made therein without departing from the scope of the appended claims.

I claim:

1. An electrostatic precipitator for removing a particulate material, comprising:
a housing having an internally formed air path communicating between an inlet for drawing polluted air containing particulate material and an air outlet for emitting clean air purified by removing the particulate material;
an air stream generating means that generates an air stream;
a discharging means that charges the particulate material;
a collection device provided in the air stream to collect the particulate material which has been charged by the discharging means, said collection device including a collection belt;
wherein said collection belt comprises a continuous flat wire belt defining a three-dimensional collection surface.

2. The electrostatic precipitator according to claim 1, further comprising a brush and vacuum assembly for removing the particulate material and reducing the risk of reentrainment in the air stream.

3. The electrostatic precipitator according to claim 2, wherein said brush comprises a rotary brush.

4. The electrostatic precipitator according to claim 3, wherein said rotary brush is stationary.

5. The electrostatic precipitator according to claim 3, wherein said rotary brush is rotatable.

6. The electrostatic precipitator according to claim 1, wherein said discharging means comprises a plurality of electrodes.

7. The electrostatic precipitator according to claim 1, wherein said discharging means comprises at least one high voltage line.

8. The electrostatic precipitator according to claim 1, wherein said flat wire belt comprises a plurality of spaced tractive rods and a plurality of rows of wickets interconnecting said plurality of spaced tractive rods.

9. The electrostatic precipitator according to claim 8, wherein each said row of wickets includes a plurality of links.

10. The electrostatic precipitator according to claim 9, wherein said plurality of links have a depth between 0.188"-0.500", thereby defining said three-dimensional collection surface.

11. The electrostatic precipitator according to claim 1, wherein said collection belt is continuously rotatable about opposed sprockets.

12. The electrostatic precipitator according to claim 11, wherein said opposed sprockets are mounted on opposing shafts.

13. An electrostatic precipitator for removing a particulate material, comprising:
a housing having an internally formed air path communicating between an inlet for drawing polluted air containing particulate material and an air outlet for emitting clean air purified by removing the particulate material;

an air stream generating means that generates an air stream;

a discharging means that charges the particulate material;

a collection device provided in the air stream to collect the particulate material which has been charged by the discharging means, said collection device including a collection belt;

wherein said collection belt comprises a flat wire belt defining a three-dimensional collection surface, said flat wire belt having a plurality of collection surfaces defined in a thickness dimension of said flat wire belt disposed generally perpendicular to a direction of travel of said collection belt, said collection surfaces of said flat wire belt defining a surface area greater than a surface area of said flat wire belt defined in a direction parallel to the direction of travel of said collection belt.

14. The electrostatic precipitator according to claim 13, further comprising a brush and vacuum assembly for removing the particulate material and reducing the risk of reentrainment in the air stream.

15. The electrostatic precipitator according to claim 14, wherein said brush comprises a rotary brush.

16. The electrostatic precipitator according to claim 15, wherein said rotary brush is stationary.

17. The electrostatic precipitator according to claim 15, wherein said rotary brush is rotatable.

18. The electrostatic precipitator according to claim 13, wherein said discharging means comprises a plurality of electrodes.

19. The electrostatic precipitator according to claim 13, wherein said discharging means comprises at least one high voltage line.

20. The electrostatic precipitator according to claim 13, wherein said flat wire belt comprises a plurality of spaced tractive rods and a plurality of rows of wickets interconnecting said plurality of spaced tractive rods.

* * * * *